United States Patent [19]

Wilner

[11] Patent Number: 4,689,600

[45] Date of Patent: Aug. 25, 1987

[54] PIEZORESISTIVE TRANSDUCER HAVING FRANGIBLE LINKS

[75] Inventor: Leslie B. Wilner, Palo Alto, Calif.

[73] Assignee: Allied Corporation, Morristown, N.J.

[21] Appl. No.: 821,087

[22] Filed: Jan. 21, 1986

[51] Int. Cl.⁴ .................................................. G01L 1/22
[52] U.S. Cl. ............................................. 338/5; 338/2
[58] Field of Search ..................... 338/2, 3, 4, 5, 6, 42; 29/610 R, 610 SG, 580; 73/726, 727

[56] References Cited

U.S. PATENT DOCUMENTS

| | | | |
|---|---|---|---|
| 3,351,880 | 11/1967 | Wilner | 338/6 |
| 4,093,933 | 6/1978 | Wilner | 338/42 |
| 4,498,229 | 2/1985 | Wilner | 29/580 |

Primary Examiner—E. A. Goldberg
Assistant Examiner—M. M. Lateef
Attorney, Agent, or Firm—Robert C. Smith; Leo H. McCormick

[57] ABSTRACT

A strain sensitive element for use in a system for converting mechanical movement of portions of the element which are movable relative to each other into electrical signals, includes a planar substrate including an N-type silicon material wherein the substrate includes grooves extending into the substrate defining an integral hinge portion between at least two relatively movable parts. At least one strain gage extends across a groove without any separate support so that the strain gage and the hinge portion are spaced apart. The strain gage is joined to two of the relatively movable parts of the substrate. At least one elongate frangible link extends across a concave pit in the substrate. The frangible link is derived from the same silicon material as the substrate. The midportion of the frangible link is spaced from the lower surface of the pit and the end portions of the frangible link are joined to the substrate. At least one resistor is provided. Conductors are provided for allowing electrical communication between the resistor, the frangible link and the strain gage which are part of an electrical circuit having a resistance which can be changed by mechanically breaking the frangible link. Also provided is contact means electrically connected to the connector means for allowing electrical communication between the strain sensitive element and outside test apparatus for measuring changes in electrical resistance in the strain gage.

23 Claims, 13 Drawing Figures

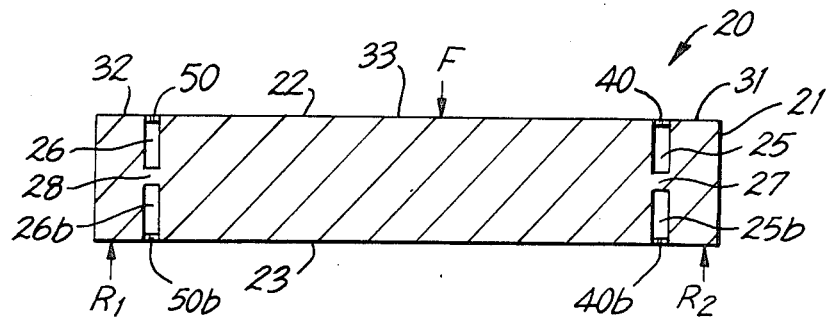
FIG. 2
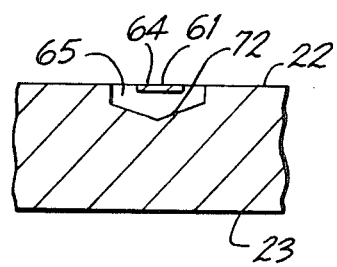
FIG. 3
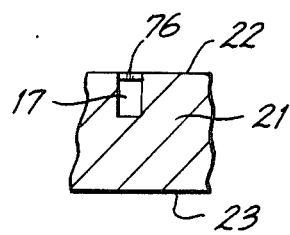   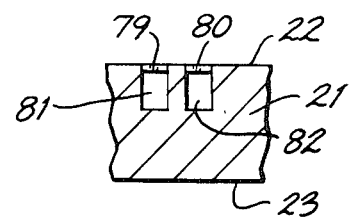
FIG. 4          FIG. 5

PIEZORESISTIVE TRANSDUCER HAVING FRANGIBLE LINKS

BACKGROUND OF THE INVENTION

1. Field of the Invention

The present invention relates to electromechanical transducers useful for converting mechanical movements or displacements into electrical signals. More particularly, the present invention concerns an improved piezoresistive transducer having an integrally formed frangible link for trimming the circuitry thereon.

2. Description of the Prior Art

Known electromechanical transducers, whether used for measuring acceleration, force or pressure, include a pressure/force sensitive element such as a diaphragm or cantilever and a strain sensing element attached to or integral with the pressure/force sensitive element.

Known transducers include unbonded wire transducers which consist of one or more wires stretched and connected between two or more points on a diaphragm and unsupported between these points. Displacement of the diaphragm stretches the wire reducing its cross-sectional area, and accordingly, increasing its resistance to the flow of electrical current in a proportional relationship to the diaphragm displacement. Also known are transducers wherein strain gages are bonded to the diaphragm using adhesives such as epoxy. These strain gages are sometimes made of thin copper alloy foil which is etched to define a gage geometry during manufacture. The foil strain gage is bonded over its entire length to the diaphragm and is not suspended therefrom. Here again, deflection of the diaphragm causes a strain in the strain gage element which changes its cross-sectional area and, accordingly, changes its resistance to the flow of electrical current.

Strain gage transducers are generally less expensive and more rugged than the larger unbonded wire transducers. Both types of transducers, however, have low gage factors (change in electrical resistance with respect to changes in strain in the gage element) and both may produce hysteresis errors affecting accuracy, when the gage is subject to periodic changes in strain.

Improvements are provided by piezoresistive transducers using a single-crystal semiconductor material, such as silicon doped with boron, for a strain gage element. The semiconductor strain gage is bonded to the diaphragm and offers the advantage of high gage factor (as much as one hundred times more sensitive than metal strain gages) and small size.

Improvements have also been provided by selectively changing the thickness of the diaphragm so that it will consist of relatively thick islands and a relatively thick rim portion, separated by thin portions. Because the deflection of the diaphragm is primarily along the thin portions, the strain gages can be advantageously mounted across the thin portions in an area of maximum strain to provide increased gage sensitivity.

U.S. Pat. No. 4,093,933 to Wilner teaches a transducer structure having a pressure diaphragm composed of a nonmetallic material that has been sculptured by etching to form thick islands and a thick rim interconnected by thin sheet material. The thick portions are separated by the thin flexures in which the deflection of the diaphragm is concentrated. Piezoresistive semiconductor sensors, similar to the type described in U.S. Pat. No. 3,351,880, are bonded on opposite sides of the thin grooves and electrical connectors are metallurgically bonded to the pads of the sensors so that the sensors may be connected in a wheatstone bridge type circuit. The sculptured pressure diaphragm is desirable and advantageous because it allows mounting the solid state strain gage elements across the points of maximum deflection which in essence mechanically amplifies the strain being sensed or measured as the diaphragm responds to forces. This structure is highly desirable because of its increased sensitivity when compared to structures wherein the strain gage element is mounted directly to the diaphragm surface along the entire length of the strain gage element.

Transducers formed from a single crystal of semiconductor material wherein the strain gages are an integral part of the semiconductor diaphragm are known in the art. These transducers offer the advantage of being small in size while having a high gage factor and are easier to manufacture. Also, the integral structure eliminates the need for an adhesive joint between the diaphragm and the strain gage. The adhesive joint is a disadvantage because it may not be as stable as the remainder of the crystal structure, and there can be relative movement, or creep, between the portions joined by the adhesive. However, these transducers, theoretically, lack the sensitivity of transducers with a sculptured diaphragm having piezoresistive semiconductors secured across slots in the diaphragm.

In U.S. Pat. No. 4,498,229, Wilner teaches an improved piezoresistive transducer and method for making same, wherein the gages are defined upon the substrate and subsequently etched from the material of the substrate. In this piezoresistive transducer the gage element is etched free of the substrate at its midportion and is integral with the substrate at its remote end portions. This piezoresistive transducer provides all the advantages of higher sensitivity provided by the sculptured pressure diaphragm and the freed gage structures described above and it also has the advantages of the one-piece integral strain gage/diaphragm structures described above.

Along other lines, it is well known that it is advantageous, in certain situations, to produce devices having electronic circuitry which can be altered after they are manufactured, to be made more suitable for the application involved. More specifically, it is common practice to trim integrated circuits by breaking or destroying a portion of the circuit to change the electrical performance characteristics of the entire circuit. The trimming of integrated circuits is sometimes performed using expensive and complex laser devices which focus laser energy on the portion of the circuit which will be severed or destroyed. Also, in metallic circuits, a portion of the circuit may be disconnected by providing an amount of electrical energy through the portion of the circuit that will cause it to self-destruct by melting. Further, circuits can be trimmed using devices which focus ultraviolet radiation on the portion of the circuit to be eliminated. All of the above-mentioned devices used for trimming circuits are expensive and in some cases difficult to use. It is desirable to have circuits which can be trimmed by relatively simple and inexpensive mechanical devices which, if the circuit is constructed accordingly, can mechanically destroy or disconnect that portion of the circuit to alter its characteristics.

Although the single-crystal piezoresistive transducer with etch-freed strain gages is known, there is still a need for piezoresistive transducer having etch-freed gages and integrated circuits which are capable of being trimmed by using simple and inexpensive mechanical means.

SUMMARY OF THE INVENTION

The operable strain sensitive element for use in a system for converting mechanical movement of portions of the element which are movable relative to each other into electrical signals, of the present invention, includes a substantially planar substrate comprising an N-type silicon crystal material. The substrate includes groove means extending into the substrate defining an integral hinge portion between at least two such relatively movable parts of the substrate. At least one strain gage extends across the groove means without any separate support so that the strain gage and the hinge portion are spaced apart. This strain gage comprises P-type silicon material and it is joined to two of the relatively movable parts of the substrate. At least one elongate frangible link having end portions and a midportion extends across a concave pit in the substrate. This frangible link is derived from the same silicon material as the substrate and comprises P-type silicon material. The midportion of this frangible link is spaced apart from the lower surface of the pit while the end portions of the link are joined to the substrate. At least one resistor is also included. Connector means for allowing electrical communication between the resistor, the frangible link and the strain gage is provided. The resistor, the frangible link and the strain gage are arranged so that they are capable of being part of an electrical circuit having a resistance which can be changed by mechanically breaking the frangible link. Also provided is contact means electrically connected to the connector means for allowing electrical communication between the strain sensitive element and outside test apparatus for measuring changes in electrical resistance in the strain gage when the strain gage is subject to stress resulting from relative movement of the movable parts of the substrate.

In another embodiment of the present invention, an operable strain sensitive element for use in a system for converting mechanical movement of relatively movable portions of the element into electrical signals includes a substantially planar substrate comprising an N-type silicon crystal material. The substrate includes groove means extending into the substrate defining an integral hinge portion between at least two relatively movable parts. At least one unitary strain gage extends across the groove means without any separate support so that the strain gage and the hinge portion are spaced apart. The strain gage is joined to two of the relatively movable parts of the substrate. The strain gage is a unitary member derived from the same silicon crystal material as the substrate and comprises P-type silicon material. At least one elongate frangible link having end portions and a midportion, is provded. This frangible link extends across a concave pit in the substrate, on the same side of the substrate as the strain gage. The frangible link is derived from the same silicon crystal material as the substrate and comprises P-type silicon material. This frangible link is oriented substantially transversely with respect to the strain gage when viewed from a position directed perpendicularly from the plane of the substrate. The midportion of the frangible link is spaced apart from the lower surface of the pit while the end portions of the frangible link are joined to the substrate. The frangible link is partially coated with a conductive metal for increasing the conductivity of the frangible link. At least one resistor is provided at the surface of the substrate. This resistor is derived from the same silicon crystal material as the substrate and comprising P-type silicon material. Also provided is connector means for allowing electrical communication between the resistor, the frangible link and the strain gage. The resistor, the frangible link and the strain gage are capable of being part of an electrical circuit having a resistance which can be changed by mechanically breaking the frangible link. The connector means includes P-type silicon material connectors derived from the same silicon crystal as the substrate. Also provided is contact means electrically connected to the connector means for allowing electrical communication between the strain sensitive element and outside test apparatus for measuring changes in electrical resistance in the strain gage when the strain gage is subject to stress resulting from relative movement of the movable parts of the substrate.

BRIEF DESCRIPTION OF THE DRAWINGS

FIG. 2 is a reduced cross-sectional view of the element of FIG. 1 taken along line 2—2;

FIG. 3 is a reduced partial cross-sectional view of the element of FIG. 1 taken along line 3—3;

FIG. 4 is a reduced partial cross-sectional view of the element of FIG. 1 taken along line 4—4;

FIG. 5 is a reduced partial cross-sectional view of the element of FIG. 1 taken along line 5—5.

DETAILED DESCRIPTION

Figure 1:
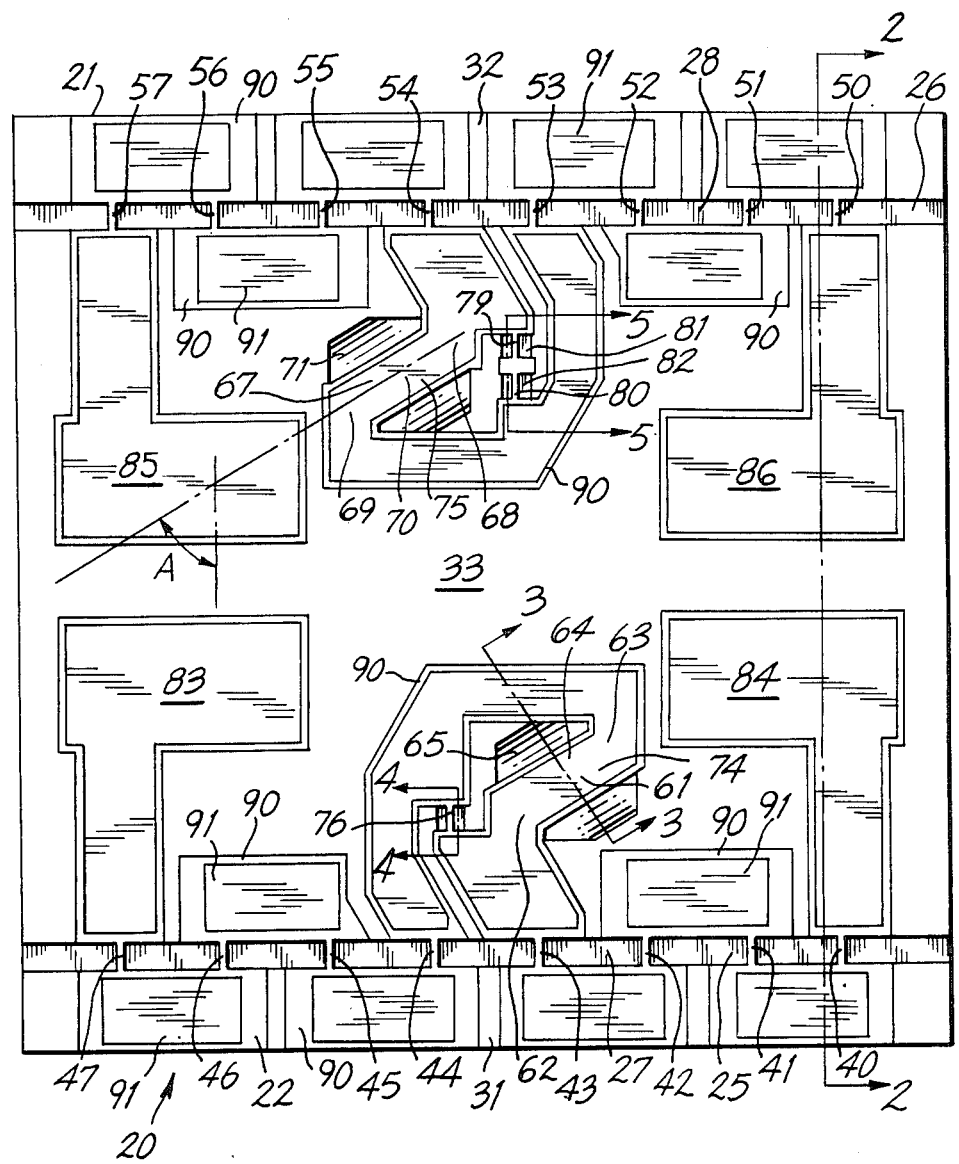
FIG. 1 is a top plan view of the strain sensitive element of the present invention.

While this invention is satisfied by embodiments in many different forms, there is shown in the drawings and will be described herein a preferred embodiment of the invention with the understanding that the present disclosure is to be considered exemplary of the principles of the invention and it is not intended to limit the invention to the embodiment illustrated. The scope of the invention will be measured by the appended claims and their equivalents.

Adverting to FIGS. 1–5, an operable strain sensitive element 20 includes a substantially planar substrate 21 comprised of piezoresistive semi-conductive material such as N-type silicon crystal having, for description purposes, a top gage side 22 and a bottom gage side 23. It should be noted that in this preferred embodiment the strain sensitive element is preferably made to contain substantially similar electrical elements and configuration on the top gage side as on the bottom gage side, with the bottom gage side being, visually substantially identical to the top gage side and preferably not a mirror or reverse image. Accordingly, many of the elements on the bottom gage side, which are substantial equivalents to elements on the top gage side, will be given the same number as the element on the top gage side along with the suffix "b" to indicate their position on the bottom gage side. It should be noted that it is within the purview of this invention to include embodiments wherein the bottom gage side contains no elements, or is configured similarly or substantially differently than the top gage side and that the embodiment described herein is exemplary of these many possibilities. Substrate 21 includes groove 25 and groove 26 extending into the substrate from top gage side 22 and groove 25b and groove 26b extending into the substrate from bottom gage side 23. These grooves define hinge portion 27 and hinge portion 28. The grooves divide the substrate into edge portion 31, edge portion 32 and center island portion 33. Also, the grooves weaken the substrate so that the thin hinge portion is relatively flexible with respect to the thicker portions defined by the edge portions and the center island portions so that the edge portions and the center portion are capable of relative movement with respect to each other.

A plurality of strain gages 40 through 47 are positioned over groove 25 between, and joined to, rim portion 31 and center island portion 33. Strain gages 40 through 47 are spaced apart from hinge portion 27 and separated or freed therefrom by groove 25. In this preferred embodiment the bottom gage side contains similarly positioned strain gages as typified by strain gage 40b in FIG. 2. Strain gage 40b is positioned over groove 25b between, and joined to, edge portion 31 and center island portion 33. Gage 40b is spaced apart from hinge portion 27 and separated or freed therefrom by groove 25b.

A plurality of strain gages 50 through 57 are positioned over groove 26 between, and joined to, rim portion 32 and center island portion 33. Strain gages 50 through 57 are spaced apart from hinge portion 28 and separated or freed therefrom by groove 26. In this preferred embodiment the bottom gage side contains similarly positioned strain gages as typified by strain gage 50b in FIG. 2. Strain gage 50b is positioned over groove 26b between, and joined to, edge portion 32 and center island portion 33. Gage 50b is spaced apart from hinge portion 28 and separated or freed therefrom by groove 26b. It is preferred that all of the strain gages be formed or derived from the same silicon crystal material as the substrate and that they are doped with boron to form P-type material. It is also within the purview of the instant invention to include strain gages which are not etch-freed but are formed on the surface of the substrate.

A frangible link 61 having end portions 62 and 63, and a midportion 64, extends across a concave multiplanar pit 65 in the substrate. Frangible link 61 is derived from the same silicon crystal material as substrate 21. Frangible link 61 is preferably doped with boron to form P-type material.

As best illustrated in FIG. 3, midportion 64 of the frangible link 61 is spaced from lower surface 72 of the concave pit. End portions 62 and 63 of the frangible link are joined to the substrate by virtue of their being formed therefrom. The top surface of the frangible link is preferably, but not necessarily, coated with a conductive metal 74 for increasing the conductivity of the frangible link.

Another frangible link 67 having end portions 68 and 69 and midportion 70 extends across the concave multiplanar pit 71 in the substrate. Frangible link 67 is also formed of the same silicon material as the substrate and it is doped with boron to form P-type silicon material. The top surface of frangible link 67 is, preferably, partially coated with a conductive metal 75 for increasing the conductivity of the frangible link. Additional frangible links (not shown) are formed on the bottom side of the substrate. These links are not described in detail because the bottom side of the substrate appears substantially the same as the top side when viewed in a plane perpendicular to the substrate.

The frangible links are oriented substantially transversely with respect to the strain gages and, in this preferred embodiment, as will be explained in more detail hereinafter, the longitudinal axes of the frangible links are oriented at an angle which is desirably within the range of about 55 to 65 degrees with respect to the strain gages and preferably at an angle of about 61 degrees with respect to the strain gages, as represented by angle A in FIG. 1.

Resistor 76 is preferably formed from the same silicon crystal material as the substrate and doped with boron to form P-type silicon material. In this preferred embodiment the resistor is formed, in a similar manner as the strain gages, so that its midportion extends over groove 77 in the substrate and its end portions are integral with the surrounding substrate material. As will be explained in more detail hereinafter, this structure for the resistor is desirable because the resistor can be formed during the same process as the strain gages. However, it is within the purview of this invention to include resistors which are not etch-freed but are formed on the surface of the substrate or separate resistors joined to the surface of the substrate using known methods. In this embodiment resistor 76 is in a parallel electrical relationship with frangible link 61.

Additional resistors 79 and 80 are in an electrical series relationship with each other and in an electrically parallel relationship with frangible link 67. Resistors 79 and 80 are formed, in a similar fashion as resistor 76, extending over grooves 81 and 82 respectively. In this embodiment, resistors 79 and 80 are preferably derived from the same silicone crystal material as the substrate and are doped with boron to form P-type silicon material.

In this preferred embodiment, the frangible links, the resistors and the strain gages are all integrally formed from the same silicon material as the substrate and are droped with boron to form P-type silicon material. Also, the electrical connector means for allowing electrical communication between the resistors, the frangible links and the strain gages is formed by infusing boron in the surface of the substrate to form P-type material, generally indicated as 90. Substantial portions of this P-type connector material are coated with conductive metal such as aluminum, gold or platinum, to increase the conductivity of the electrical circuit which includes the frangible links, the strain gages and the resistors.

Metalized areas 81, 82, 83 and 84 provide metallic contact surfaces for connecting the strain sensitive elements to outside circuitry. In particular, the contact surfaces are electrically connected to the electrical connectors, the strain gages, the frangible links and the resistors. Accordingly, the contract surfaces can be used to establish electrical communication between the strain sensitive elements and an outside test apparatus for measuring changes in electrical resistance in the strain gages when the strain gages are subject to stress resulting from relative movement of the movable parts of the substrate. It should be pointed out again that, in the preferred embodiment, the elements shown on top gage side 22 are also, preferably, on bottom gage side 23 so that both sides look substantially similar when viewed from a plane perpendicular to the substrate.

Accordingly, metalized surfaces on the bottom gage side of the substrate are also connectable to outside circuitry.

The strain sensitive element of the present invention is extremely small in size having an overall approximate desirable length and width of generally about 0.048 inch (1.2 mm) and 0.040 inch (1.0 mm) respectively, and a thickness desirably within the range of about 0.003 inch (0.076 mm) and 0.015 inch (0.381 mm) and preferably within the range of about 0.0073 inch (0.185 mm) to 0.0077 inch (0.196 mm). The hinge portion of the substrate is desirably within the range of about 0.0001 inch (0.0025 mm) to 0.003 inch (0.076 mm) thick. The strain gages are so small that they are difficult to see with the unaided eye. A representative size for an etch-freed strain gage is about 30 microns long, 6 microns wide and 1.5 microns thick. The frangible link is desirably within the range of about 1 to 1.5 microns thick, about 0.001 inch (0.25 mm) wide and within the range of about 0.0017 inch (0.043 mm) to 0.0025 inch (0.064 mm) long.

Although the instant embodiment is described having 16 strain gages, three resistors and two frangible links on each side of the substrate, it is within the purview of the present invention to include embodiments having one or more etch-freed strain gages, one or more resistors and one or more etch-freed frangible links on a silicon substrate.

In use, the center portion 33 of the substrate may be attached in an accelerometer assembly so that, for example, a force F, caused by acceleration, as best illustrated in FIG. 2, and resisted by forces R1 and R2, resulting from the acceleration, will cause the substrate to deflect so that strain gages 40 through 57 on top gage side 22 will be in compression while strain gages 406 through 57b on bottom gage side 23 will be in tension. In use, the strain sensitive element of the present invention can be connected to an outside test apparatus by establishing electrical communication with metalized areas 83 through 86 and metalized areas 83b through 86b (not shown) so that a wheatstone bridge is formed with one leg of the bridge being established between metalized areas 83 and 84, a second leg being established between metalized areas 85 and 86, a third leg between metalized areas 83b and 84b (not shown) and a fourth leg between metalized areas 85b and 86b (not shown). When current is flowing through the strain gages the resistance of the gages on the bottom gage side will increase because they are stressed in tension while the resistance of the strain gages on the top gage side will decrease because they are stressed in compression. This change in resistance is related to the deflection within the element and accordingly, related to force F being measured so that the acceleration being experienced by the element, which is a function of the force F and its mass, can be measured and recorded.

A key advantage of the instant invention over the prior art is the presence of an etch-freed frangible link which can be broken by simple mechanical means. Referring to FIG. 1, it can be seen that the circuit resistance between strain gage 43 and strain gage 44 is a function of the resistance of resistor 76 and the resistance of frangible link 61. Accordingly, the resistance of the electrical circuit between strain gage 43 and 44 can be altered by mechanically breaking the frangible link so that the resistance is primarily a function of the resistance of resistor 76. Also, the resistance in the electrical circuit running between strain gages 53 and 54 is a function of the resistance of resistors 79 and 80 and the resistance of frangible link 67. Accordingly, the resistance of the circuit between strain gages 53 and 54 can be changed by mechanically breaking frangible link 67 so that the resistance of the circuit is primarily a function of the resistance of resistors 79 and 80. The act of physically destroying a portion of a circuit to change the circuit properties is referred to as "trimming." The advantage in the present invention is that the trimming can be performed without the use of lasers or other similar sophisticated equipment because of the etch-freed frangible links. The act of trimming, with respect to the instant invention, can be performed in a microscope using a mechanical tool such as manually guided wire. A simple tool made of 0.007 inch diameter tungsten wire beveled at the distal tip and coated or covered at the proximal end to provide an easy grip, can be used to manually break the frangible links of the instant invention. Also, a similar tool can be guided under a microscope using easily devised fixturing.

It is within the purview of the present invention to include the etch-freed frangible link in parallel with resistors which are in series with each other or also in parallel relationship with each other, and it is also within the purview of the instant invention to include an etch-freed frangible link wherein the resistor or resistors are in series with the links so that the termination of the link produces an infinite resistance in that portion of the circuit. It is also within the purview of the present invention to include a plurality of frangible link/resistor combinations on one surface so that there are many possible combinations and permutations for adjusting the resistance of the overall circuit or circuits within the substrate.

A method of forming etch-freed strain gages in a silicon substrate is taught in U.S. Pat. No. 4,498,229 to Wilner. The etch-freed strain gages and resistors of the preferred embodiment can be made along the lines recited in the '229 patent to Wilner with additional steps being required to form the etch-freed frangible links.

Figure 6A:
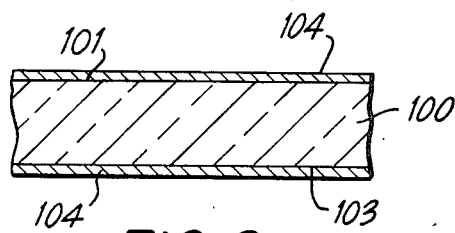
FIGS. 6a through 6h are cross-sectional views showing successive steps of a method of manufacturing the strain sensitive element of the present invention.

Turning now to FIGS. 6a–6h, a sequence of steps is illustrated for producing a piezoresistive strain sensitive element having an etch-freed frangible link and an etch-freed strain gage. A first step in the process is to select a planar N-type silicon crystal element 100 with the plane of said element preferably oriented (110) having a gage side 101 and an opposite back side 103. Element 100 is desirably within the range of about 0.0073 inch and 0.0077 inch (0.185 mm and 0.196 mm) thick. An oxide layer 104 is formed, in a first forming step, on both sides of element 100 to a depth of generally about 0.6 micron, as best illustrated in FIG. 6a. It is also within the purview of the present invention to include forming oxide only on the gage side of the element, while protecting the back side, in the first forming step, or to perform identical steps on both sides of the element, so that both sides are similar or substantially identical when viewed from a plane perpendicular to the plane of the element.

Figure 6B:
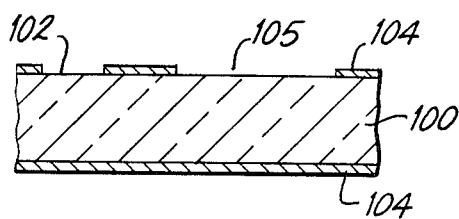

As illustrated in FIG. 6b, a strain gage indexed [111] and a frangible link are defined on the gage side of the element using a photolithographic process causing the opening of a strain gage aperture 102 and a frangible link aperture 105 in oxide layer 104. These apertures are shaped and formed to define the desired strain gage, in size and orientation, and the desired frangible link in size and orientation. It should be noted that it is desirable to produce a frangible link which will be long enough to accomodate the tool which will be used to break it. Generally speaking, the frangible link is desirably longer than that portion of the tool used to break the link in order to optimize the accessibility to the link for the purpose of mechanically breaking it. Once the length of the link is chosen, it is desirable to form the widest possible frangible link to provide the maximum possible area for the application of a metalized coating which will be described in more detail hereinafter. Further it is desirable to have the thinnest possible link which will achieve mechanical integrity during the manufacturing process and in use but still be easily breakable under mechanical action.

It is within the purview of the present invention to include frangible links having any angular orientation with respect to the strain gage including zero degrees. However, as will be explained in more detail hereinafter, by orienting the frangible link at an angle with respect to the axis of the strain gage, the etching process which produces the frangible link can produce the widest possible link. When forming frangible links on both sides of a silicon crystal element, with the plane of the element oriented (110) and the strain gage indexed in the [111] direction, the frangible link angle of 61.2 degrees is believed to be an optimum angle for producing the widest possible link. When working with a silicon crystal element having the plane of the element oriented (100) and the strain gage indexed in the [110] direction the angle between the frangible links and the strain sensitive elements is preferably 45 degrees. However, it is preferred that the element be oriented at (110) because this orientation allows the etch forming of a groove having vertical walls.

Although the preferred embodiment contains strain gages and etch-freed frangible links on both sides of the element, the process described herein, for the purpose of simplicity, uses only one side of the element. Accordingly, during portions of the photolithographic process, it is desirable to protect oxide layer 104 on back side 103 because the compounds used to open the strain gage and the frangible link apertures will also attack the oxide on the back side. In the alternative, the oxide could remain unprotected and the photolithographic process allowed to interact with the oxide. Also, if the oxide is not formed on the backside, no protection is necessary.

Figure 6C:
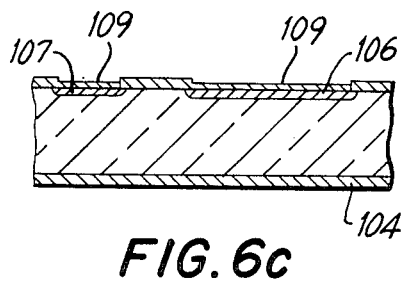

In the next step, as illustrated in FIG. 6c, boron is diffused in the open strain gage aperture and the open frangible link aperture to achieve a boron density of substantially between about $3 \times 10^{19}$ and $10^{21}$ atoms of boron per cc of strain gage and frangible link material to a depth of substantially about 0.5 micron to 5 microns, and preferably about 1.0 micron. This diffusion step may be carried out by subjecting the element to a temperature of about 1100 degrees C. for substantially about 90 minutes, in the presence of a boron source such as $B_2O_3$ to form the frangible link 106 and the strain gage 107, as best illustrated in FIG. 6c. A new oxide layer 109 is then formed to a depth of about 0.5 micron. It should be noted that the forming of a new oxide layer is not a necessary step, but an optional, desirable, step.

Figure 6D:
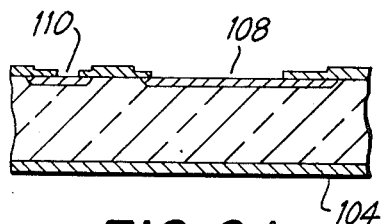
Figure 6E:
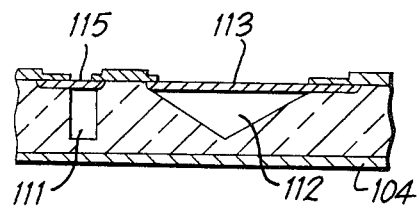
Figure 6F:
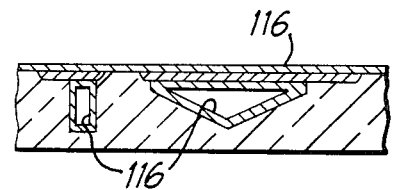

At this point in the process, the element is ready for the steps which will produce the groove which will provide the hinge portions of the element and separate these hinge portions from the strain gage, and which will produce the pit under the frangible link. Referring now to FIG. 6d, in a second defining step, an etching pattern is opened on the gage side to define a groove to be formed in the element over which the strain gage will extend, and to define the concave pit over which the frangible link will extend. This second defining step is performed by using a photolithographic process wherein portions of oxide layer 109 are removed to define the groove and the pit preferably in a process using buffered hydrofluoric acid. Also, it is desirable to protect the oxide layer on the back side during this process. In the alternative, if no oxide is formed on the back side no protection is necessary. As a result of this second defining step, a groove aperture 110 and a pit aperture 108 are defined on the gage side of the element.

At this point the element is prepared for the etching step. Etching may be performed using potassium hydroxide-water-isopropyl alcohol bath. Preferably, an ethylene diamine-pyrochatechol etch is utilized. During the etching procedure, areas protected by oxide and areas heavily doped with boron do not readily etch. Accordingly, a groove 111 will be formed in the shape defined in the second defining step. The etching procedure is performed to a depth necessary to undercut the strain gage. Preferably, the etching procedure will be formed to a depth which will produce a residual thickness at the base of the grooves in the range of about 0.0001 inch (0.0025 mm) and 0.003 inch (0.076 mm) depending on the function the transducer will perform. Simultaneously, the etching procedure will remove material around and under the frangible link. When the frangible link is oriented at an angle of 61.2 degrees with respect to the strain gage which is indexed at [111], the etching process will produce a convave six-walled pit having two vertical walls parallel to the walls in the groove under the strain gage, two vertical walls oriented at 70.5 degrees from the groove, and two walls sloping downwardly at 35 degrees and intersecting the surface of the element at an angle of about 54.7 degrees from the groove. These angles are not shown specifically in FIG. 6. This etching step can be performed in generally about four hours depending on the process parameters. The etching step produces groove 111 over which strain gage 115 passes and a six-sided convave pit 112 over which frangible link 113 passes.

At this step in the process a strain sensitive element having an etch-freed strain gage extending across a groove, and an etch-freed frangible link extending across a pit, both without any separate support, have been formed. The remaining steps in the process are performed for the purpose of forming a surface which is adapted to the electrical communication with exterior circuits and between electrical elements within the silicon crystal element, and to cut the element to a proper size. Adverting now to FIG. 6f, all residual oxide is stripped, in a first stripping step, from the element. Then, forming, in a third forming step, an oxide layer 116 is formed on all surfaces of the element accessible from the gage side.

Figure 6G:
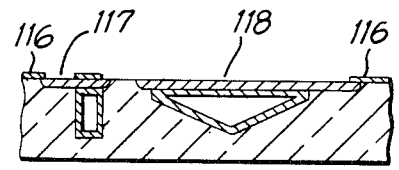

Referring to FIG. 6g, in a third defining step, using a photolithographic process, a contact pattern is developed by opening contact windows 117 and 118 respectively in oxide layer 116.

Figure 6H:
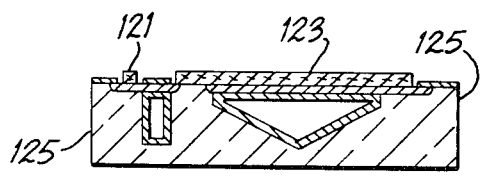

Referring now to FIG. 6h, in a first depositing step, the contact windows are subject to a metalizing process to produce contact surfaces 121 and 123 and other contact surfaces, not shown, which are used to join the element to outside circuitry, to improve the electrical conductivity between electrical elements in the crystal and to improve the conductivity of the frangible link. Specifically, surface 123 over the frangible link improves the conductivity of the frangible link and contact surface 121 adjacent to the strain gage may be used for connecting to an outside circuit.

Finally, the element is cut from the substrate using cutting means such as a diamond saw or an ultrasonic impact grinder to produce an element of the exact size desired having sides 125. Also, another etching step can be used to free the element or separate the elements.

Although the process described hereinabove recites steps to produce one etch-freed strain gage and one etch-freed frangible link these steps are applicable to a process for producing an element having numerous etch-freed strain gages, etch-freed frangible links and resistors which are etch-freed or which are formed in the surface of the element or separately applied through metalized surfaces. Also, the process is applicable to forming a plurality of elements. When multiple elements are formed from a large crystal, the final step involves cutting of the substrate to produce this plurality of defined elements. It is preferred that the process described hereinabove be used to produce a plurality of elements from one substrate.

It can be seen that the present invention provides a strain sensitive element for use in a system for converting mechanical movement into variations in electrical characteristics which may be used for such devices as accelerometers, pressure transducers, displacement gages and the like. Thus, it can be seen that the present invention provides a simple, straightforward, reliable, easily fabricated, strain sensitive element having at least one etch-freed piezoresistive strain gage passing over a groove in the element and at least one etch-freed frangible link passing over a pit in the element, wherein the strain gage, the frangible link and the element are all formed from the same silicon crystal substrate.

What is claimed is:

1. An operable strain sensitive element for use in a system for converting mechanical movement of portions of the element which are movable relative to each other into electrical signals, comprising:
   a substantially planar substrate comprising an N-type silicon crystal material, said substrate including groove means extending into said substrate defining an integral hinge portion between at least two relatively movable parts;
   at least one unitary strain gage extending across said groove means without any separate support so that said strain gage and said hinge portion are spaced apart, said strain gage being a unitary member derived from the same silicon crystal material of said substrate, said strain gage comprising P-type silicon material, said strain gage being joined to two of said relatively movable parts of said substrate;
   at least one elongate frangible link having end portions and a midportion, said frangible link extending across a concave pit in said substrate on the same side of said substrate as said strain gage, said frangible link being derived from the same silicon crystal material as said substrate, said frangible link comprising P-type silicon material, said midportion of said frangible link being spaced from the lower surface of said pit, said end portions of said frangible link being joined to said substrate;
   at least one resistor at the surface of said substrate;
   connector means for allowing electrical communication between said resistor, said frangible link and said strain gage; said resistor, said frangible link and said strain gage capable of being part of an electrical circuit having a resistance which can be changed by mechanically breaking said frangible link; and
   contact means electrically connected to said connector means for allowing electrical communication between said strain sensitive element and outside apparatus for measuring changes in electrical resistance in said strain gage when said strain gage is subject to stress resulting from relative movement of said movable parts of said substrate.

2. The strain sensitive element of claim 1 wherein said resistor is in a parallel electrical relationship with said frangible link.

3. The strain sensitive element of claim 1 wherein said resistor is derived from the same silicon crystal material as said substrate and comprises P-type silicon material.

4. The strain sensitive element of claim 1 wherein said connector means includes P-type silicon material connectors, derived from the same silicon crystal material as said substrate.

5. The strain sensitive element of claim 1 wherein the frangible link is partially coated with a conductive metal for increasing the electrical conductivity of said frangible link.

6. The strain sensitive element of claim 4 wherein portions of said connector means are coated with a conductive metal for increasing the electrical conductivity of said connector means.

7. The strain sensitive element of claim 5 wherein said conductive metal is selected from the group consisting of aluminum, gold and platinum.

8. The strain sensitive element of claim 1 wherein said strain gage is positioned in generally about the direction of said silicon crystal substrate.

9. The strain sensitive element of claim 1 wherein said frangible link is oriented substantially transversely with respect to said strain gage when viewed from a position directed perpendicularly from the plane of said substrate.

10. The strain sensitive element of claim 8 wherein the longitudinal axis of said frangible link is oriented at an angle within the range of about 55 to 65 degrees with respect to said strain gage.

11. The strain sensitive element of claim 8 wherein the longitudinal axis of said frangible link is oriented at an angle of about 61 degrees with respect to said strain gage.

12. The strain sensitive element of claim 1 wherein the length of the portion of said frangible link extending over said pit is substantially about three times longer than the width of said frangible link.

13. The strain sensitive element of claim 1 wherein said concave pit includes a multiplanar surface.

14. The strain sensitive element of claim 1 wherein said frangible link is within the range of about 0.0017 to 0.0025 inch long.

15. The strain sensitive element of claim 14 wherein said frangible link is substantially about 0.001 inch wide.

16. The strain sensitive element of claim 1 wherein said frangible link is within the range of about 1 to 1.5 microns thick.

17. The element of claim 1 wherein said planar substrate is within the range of about 0.003 inch to 0.015 inch thick.

18. The element of claim 1 wherein said planar substrate is within the range of about 0.0073 inch to 0.0077 inch thick and said hinge portion is within the range of about 0.0001 to 0.003 inch thick.

19. An operable strain sensitive element for use in a system for converting mechanical movement of portions of the element which are movable relative to each other into electrical signals, comprising:

a substantially planar substrate comprising an N-type silicon crystal material, said substrate including groove means extending into said substrate defining an integral hinge portion between at least two relatively movable parts;

at least one strain gage extending across said groove means without any separate support so that said strain gage and said hinge portion are spaced apart, said strain gage comprising P-type silicon material, said strain gage being joined to two of said relatively movable parts of said substrate;

at least one elongate frangible link having end portions and a midportion, said frangible link extending across a concave pit in said substrate, said frangible link being derived from the same silicon crystal material as said substrate, said frangible link comprising P-type silicon material, said midportion of said frangible link being spaced from the lower surface of said pit, said end portions of said frangible link being joined to said substrate;

at least one resistor;

connector means for allowing electrical communication between said resistor, said frangible link and said strain gage; said resistor, said frangible link and said strain gage capable of being part of an electrical circuit having a resistance which can be changed by mechanically breaking said frangible link; and contact means electrically connected to said connector means for allowing electrical communication between said strain sensitive element and apparatus for measuring changes in electrical resistance in the strain gage when the strain gage is subject to stress resulting from relative movement of said movable parts of said substrate.

20. An operable strain sensitive element for use in a system for converting mechanical movement of portions of the element which are movable relative to each other into electrical signals, comprising:

a substantially planar substrate comprising an N-type silicon crystal material, said substrate including groove means extending into said substrate defining an integral hinge portion between at least two relatively movable parts;

at least one unitary strain gage extending across said groove means without any separate support so that said strain gage and said hinge portion are spaced apart, said strain gage being a unitary member derived from the same silicon crystal material of said substrate, said strain gage comprising P-type silicon material, said strain gage being joined to two of said relatively movable parts of said substrate;

at least one elongate frangible link having end portions and a midportion, said frangible link extending across a concave pit in said substrate on the same side of said substrate as said strain gage, said frangible link being derived from the same silicon crystal material as said substrate, said frangible link comprising P-type silicon material, said frangible link being oriented substantially transversely with respect to said strain gage when viewed from a position directed perpendicularly from the plane of said substrate, said midportion of said frangible link being spaced from the lower surface of said pit, said end portions of said frangible link being joined to said substrate, said frangible link being partially coated with a conductive metal for increasing the conductivity of said frangible link;

at least one resistor at the surface of said substrate, said resistor being derived from the same silicon crystal material as said substrate and comprising P-type silicon material;

connector means for allowing electrical communication between said resistor, said frangible link and said strain gage; said resistor, said frangible link and said strain gage capable of being part of an electrical circuit having a resistance which can be changed by mechanically breaking said frangible link, said connector means including P-type silicon material connectors derived from the same silicon crystal as said substrate; and contact means electrically connected to said connector means for allowing electrical communication between said strain sensitive element and outside apparatus for measuring changes in electrical resistance in the strain gage when the strain gage is subject to stress resulting from relative movement of said movable parts of said substrate.

21. The strain sensitive element of claim 20 wherein said resistor is in a parallel electrical relationship with said frangible link.

22. The strain sensitive element of claim 20 wherein said strain gage is positioned generally about the [111] direction of said silicon crystal substrate.

23. The strain sensitive element of claim 22 wherein the longitudinal axis of said frangible link is oriented at an angle within the range of about 55 to 65 degrees with respect to said strain gage.

* * * * *